United States Patent
De Angelis et al.

(10) Patent No.: US 9,556,052 B2
(45) Date of Patent: Jan. 31, 2017

(54) LAMINATE FUSION DRAW APPARATUS AND METHOD OF USE THEREOF

(71) Applicant: Corning Incorporated, Corning, NY (US)

(72) Inventors: Gilbert De Angelis, Lindley, NY (US); Bruno Le Gallic, Fontainebleau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/787,613

(22) PCT Filed: May 8, 2014

(86) PCT No.: PCT/US2014/037236
§ 371 (c)(1),
(2) Date: Oct. 28, 2015

(87) PCT Pub. No.: WO2014/186196
PCT Pub. Date: Nov. 20, 2014

(65) Prior Publication Data
US 2016/0115067 A1    Apr. 28, 2016

Related U.S. Application Data

(60) Provisional application No. 61/822,464, filed on May 13, 2013.

(51) Int. Cl.
*C03B 17/06* (2006.01)
*C03B 17/02* (2006.01)
(Continued)

(52) U.S. Cl.
CPC ............ *C03B 17/064* (2013.01); *C03B 5/16* (2013.01); *C03B 5/18* (2013.01); *C03B 5/225* (2013.01);
(Continued)

(58) Field of Classification Search
CPC .......... C03B 17/064; C03B 17/02; B29C 31/02
See application file for complete search history.

(56) References Cited

U.S. PATENT DOCUMENTS 4,214,886 A * 7/1980 Shay .................. C03B 17/02
65/121
4,549,895 A   10/1985 Izumitani et al.
(Continued)

FOREIGN PATENT DOCUMENTS

| CN | 201458947 U | 5/2010 |
| WO | 2012093563 | 7/2012 |
| WO | 2014018838 | 1/2014 |

OTHER PUBLICATIONS

International Search Report, issued in connection with corresponding PCT application No. PCT/US2014/037236, Aug. 19, 2014.

*Primary Examiner* — Jodi C Franklin
(74) *Attorney, Agent, or Firm* — John L. Haack (57) ABSTRACT

A laminate fusion draw apparatus including: a core isopipe having a first core melter; a clad isopipe having a clad melter; a first core down comer between the core melter and the core isopipe; and a second clad down comer between the clad melter and the clad isopipe, the second clad down comer having an independently adjustable linear and horizontal position with respect to a fixed horizontal position of the first down comer, and the core melter and the clad melter are linearly moveable for relative movement in the same or opposite horizontal direction, as described herein. Also disclosed is a method of using the apparatus where the first core down comer remains substantially centered or concentric on the first inlet tube, and the second clad down comer remains substantially centered or concentric on the second inlet tube.

17 Claims, 4 Drawing Sheets

(51) Int. Cl.
*C03B 5/26* (2006.01)
*C03B 5/225* (2006.01)
*C03B 5/16* (2006.01)
*C03B 5/18* (2006.01)

(52) U.S. Cl.
CPC ................ *C03B 5/26* (2013.01); *C03B 17/02* (2013.01); *C03B 17/06* (2013.01)

(56) References Cited

U.S. PATENT DOCUMENTS

| | | | | |
|---|---|---|---|---|
| 7,201,965 B2* | 4/2007 | Gulati | .................... | B32B 17/06 428/1.1 |
| 8,007,913 B2* | 8/2011 | Coppola | ................ | B32B 17/06 428/426 |
| 8,646,291 B2* | 2/2014 | Coppola | ................ | C03B 17/064 264/165 |
| 9,193,617 B2* | 11/2015 | Kersting | ................ | C03B 17/064 |
| 9,233,869 B2* | 1/2016 | Pitbladdo | .............. | C03B 17/064 |
| 9,340,451 B2* | 5/2016 | Boek | ........................ | C03C 15/00 |
| 9,393,760 B2* | 7/2016 | He | .......................... | B32B 17/06 |
| 9,434,632 B2* | 9/2016 | Amosov | ................. | C03B 17/02 |
| 2009/0013725 A1* | 1/2009 | Kano | ........................ | C03B 7/02 65/99.1 |
| 2014/0137601 A1 | 5/2014 | Aburada et al. | | |
| 2015/0166388 A1* | 6/2015 | Kersting | ................ | C03B 17/064 52/506.02 |
| 2016/0159677 A1* | 6/2016 | Coppola | ................. | C03C 3/087 65/53 |
| 2016/0185643 A1* | 6/2016 | Kersting | ................. | C03B 7/02 65/53 |
| 2016/0229729 A1* | 8/2016 | Peterson | ................. | C03B 7/088 |

* cited by examiner

LAMINATE FUSION DRAW APPARATUS AND METHOD OF USE THEREOF

This application claims the benefit of priority to U.S. Application No. 61/822,464 filed on May 13, 2013 the content of which is incorporated herein by reference in its entirety.

The entire disclosure of any publication or patent document mentioned herein is incorporated by reference.

CROSS-REFERENCE TO RELATED APPLICATIONS

This application is related to commonly owned and assigned U.S. Pat. No. 8,007,913, issued Aug. 30, 2011, to Coppola, et al., entitled "Laminated Glass Articles and Methods of Making Thereof"; U.S. Ser. No. 13/479,701, filed May 24, 2012, to Coppola, et al., entitled "Apparatus and Method for Control of Glass Streams in Laminate Fusion"; U.S. Ser. No. 61/676,028, filed Jul. 26, 2012, to Kersting, et al., entitled "Refractory Liner Structure and Use in Glass Fusion Draw"; U.S. Ser. No. 61/678,218, filed Jul. 8, 2012, to Coppola, et al., entitled "Method and Apparatus for Laminate Fusion," and U.S. Ser. No. 13/679,263, filed Nov. 16, 2012, to Aburada, et al., entitled "Methods and Apparatuses for Fabricating Continuous Glass Ribbons," which content is relied upon and incorporated herein by reference in its entirety, but does not claim priority thereto.

BACKGROUND

The disclosure generally relates to the manufacture of a glass sheet in a laminate fusion draw machine (LFDM).

SUMMARY

The disclosure provides a glass melting apparatus for use in a LFDM, which apparatus provides a continuous and correct flow distribution of glass on the clad isopipe. The glass melting apparatus can compensate for movement, such as by thermal expansion or mechanical adjustments, of the fusion draw machine (FDM) by selectively adjusting the location of the clad down comer with respect to the inlet of the clad isopipe to achieve and maintain concentricity while maintaining a core down comer and core isopipe in a fixed position and concentric relation.

In embodiments, the disclosure provides an apparatus and method of using the apparatus that can, for example, control or adjust the quality properties of the molten glass streams in a laminate fusion apparatus. The apparatus can determine and adjust the quality of the molten glass flow properties, such as the concentricity of glass flow from the glass source to the isopipe. This enhanced control of the molten glass flow properties can provide enhanced properties in the resulting laminated glass ribbon. The disclosure provides a down comer concentriciy flow control that provides operational and product quality advantages as described herein.

In embodiments, the disclosure provides an apparatus and process that provides for a modification of a Laminate Fusion Draw Machine (LFDM) that permits adjustment of clad glass during production. A muffle suspension control system provides compensation for multiple movements of the clad and core isopipes during production, for example, allowing a clad down comer to spatially adjust to maintain a continuous and correct glass flow, while maintaining a core down comer in a fixed position.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus and the disclosed apparatus and method of using the apparatus provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Down comer" or "downcomer" refers to a structural element, such as a conduit, that provides from a source or supply of molten glass to a particular isopipe, such as a vertical tube that delivers molten glass to the inlet of an isopipe, such as a clad glass isopipe down comer, a core glass isopipe down comer, or both "Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The apparatus and methods of the disclosure can include any value or any combination of the values, specific values, more specific values, and preferred values described herein, including explicit or implicit intermediate values and ranges.

The apparatus and the method of using the apparatus of the disclosure can include the components or steps listed in the claim, plus other components or steps that do not materially affect the basic and novel properties of the compositions, articles, apparatus, or methods of making and use of the disclosure, such as a particular apparatus configuration, particular additives or ingredients, a particular agent, a particular structural material or component, a particular irradiation or temperature condition, or like structure, material, or process variable selected.

U.S. Pat. No. 4,734,250, mentions a concentric pipe loop arrangement for pressurized water nuclear reactors. A cold leg piping 19 is concentrically mounted within hot leg piping 13. Thus, upon leaving the high pressure discharge 29 of coolant pump 17, the cooled reactor coolant flows within cold leg piping 19, through slip-fit transition piece 20, and into the reactor vessel down comer comprising the annulus 53 between the pressure vessel 11 and the core barrel 34 for subsequent passage through the nuclear core 10. Slip-fit transition piece 20 is welded to the other end 35 of cold leg piping 19. FIG. 4 shows spacer bars 37 between transition piece 20 and the inner surface 38 of the reactor vessel outlet flange or nozzle 12 which aid in maintaining the concentricity of cold leg piping 19 with hot leg piping 13 in a horizontal direction. Transition piece 20 includes two outlet ends 39 forming a "Y"-shaped configuration. Each outlet end slip fits within an opening 40 in the wall of outlet nozzle 12 between the reactor vessel 11 and the core barrel 34. The relationship of openings 40 and legs 39 provide for concentricity of the hot 13 and cold 19 leg piping in a vertical direction. Of interest is that the core barrel flange 41 fits against the reactor vessel outlet nozzle 12 in a manner that is common in the art.

In embodiments, the disclosure provides a laminate fusion draw apparatus comprising:

a core isopipe having a first core melter, the core melter being, in operation, in flow communication with and providing molten glass to the core isopipe;

a clad isopipe atop the core isopipe, the clad isopipe having a clad melter, the clad melter being, in operation, in flow communication with and providing molten glass to the clad isopipe;

a first core down comer between the core melter and the core isopipe, the first down comer having an adjustable and fixable horizontal position and a fixed vertical position; and a second clad down comer between the clad melter and the clad isopipe, the second clad down comer having an independently adjustable linear and horizontal position with respect to a fixed horizontal position of the first down comer, the core melter and the clad melter are linearly moveable, that is co-linear, parallel, or both, for relative linear movement in the same or opposite horizontal direction, and in operation, the first core down comer remains substantially centered, that is fixed, on the first inlet tube of the core isopipe, and the second clad down comer remains substantially centered on the second inlet tube of the clad isopipe.

In embodiments, the apparatus can further comprise, for example, a sensor to monitor the concentricity of the second clad down comer and the second inlet tube of the clad isopipe.

In embodiments, the apparatus can further comprise, for example, a mechanism to adjust the concentricity of the second clad down comer and the second inlet tube of the clad isopipe.

In embodiments, the apparatus can further comprise, for example, a sensor to monitor the concentricity of the second clad down comer and the second inlet tube of the clad isopipe, and a mechanism to adjust the concentricity of the second clad down comer and the second inlet tube of the clad isopipe in response to the sensor signaling a deviation from concentricity.

In embodiments, the core melter and clad melter can be, for example, co-located on the same linear path, for example, a co-linear track or two parallel tracks.

In embodiments, the core melter and clad melter can be, for example, each housed within a separate movable carriage.

In embodiments, the clad isopipe can be, for example, a plurality of stacked isopipes.

Figure 2:
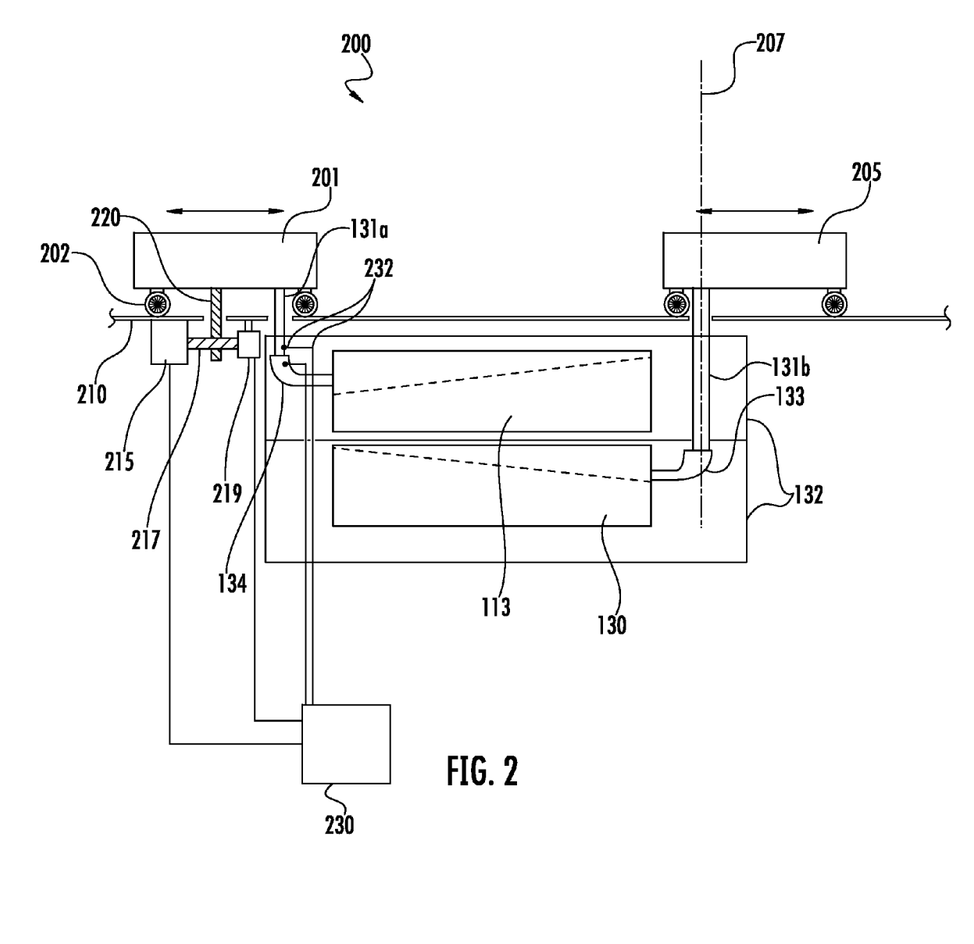
FIG. 2 shows an exemplary laminate fusion draw melt system of the disclosure including the isopipes of FIG. 1.
Figure 3:
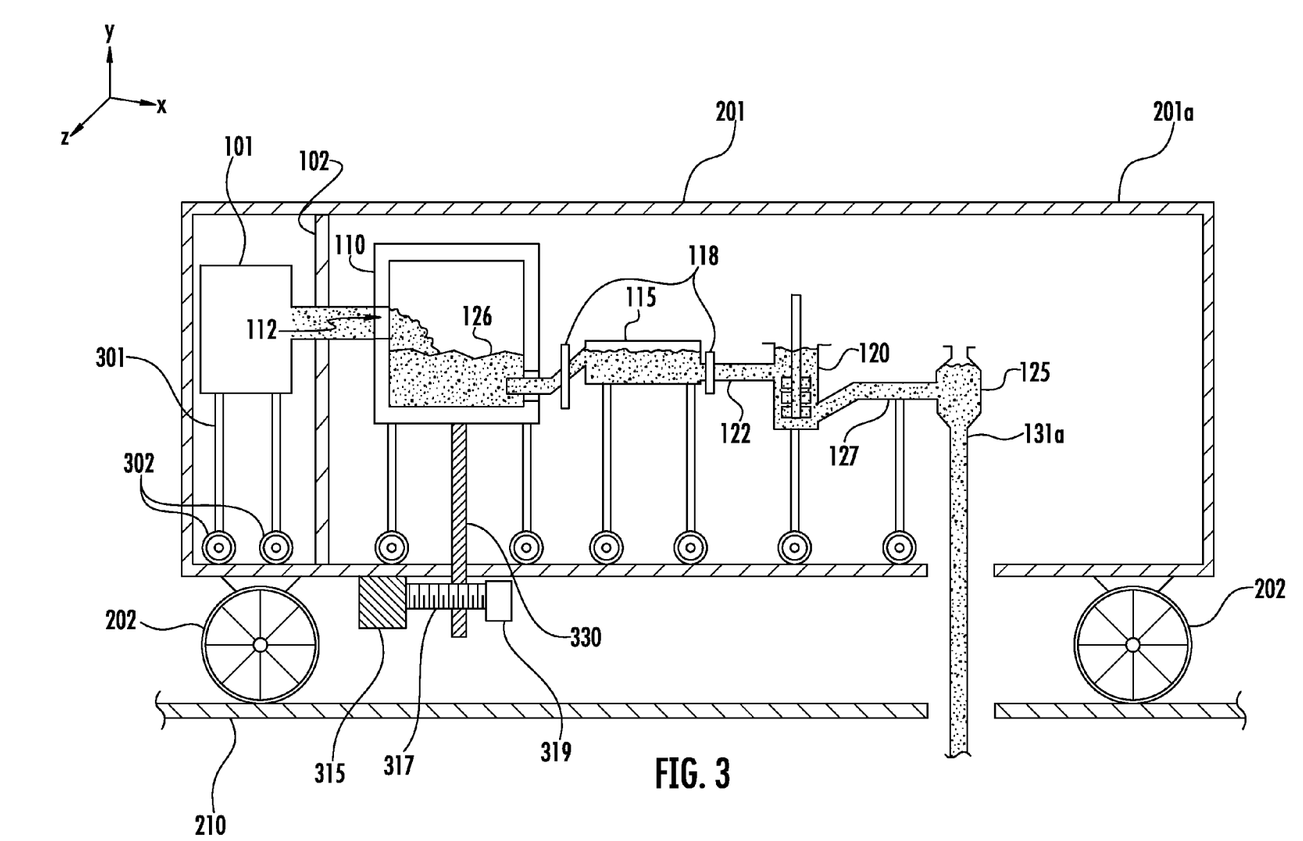
FIG. 3 shows additional details of the clad melter unit or second movable melt unit of FIG. 2 having a movable housing or frame.

In embodiments, the clad melter can include (see FIGS. 2 and 3), for example:

a batch filling machine (101);

a melt vessel (110);

pre-melt fluidly coupled transport (PMFCT) finer vessel (115); and a delivery system comprising:

a finer to stir chamber conduit (FSC) (122);

a stirring chamber (120);

a stir chamber to bowl conduit (SCB) (127);

a delivery vessel or bowl (125); and a down comer (131*a*).

In embodiments, the basic components of a clad melter or core melter are disclosed in greater detail in the above mentioned commonly owned and assigned U.S. Ser. No. 13/679,263, see for example, paragraphs [0021] to [0026], and [0028] to [0034], and FIG. 1 therein.

In embodiments, the disclosure provides a method of using the abovementioned apparatus comprising:

selecting a batch glass composition for each of the clad melter and core melter;

independently pre-heating the clad melter and core melter, for example, from ambient temperature to an elevated temperature until expansion of the clad melter, the core melter, and glass seals form between glass jointed components;

setting the gaps and forming the seals between adjacent melter components in each of the clad melter and the core melter by adjusting the relative linear position of and separation between the clad melter and the core melter;

fixing the relative position of the clad melter and the core melter;

filling the respective clad melter and the core melter with the selected batch glass compositions;

initiating flow of the molten glass in each of the respective clad melter and the core melter;

coupling the fixed down comer associated with the core melter and the core isopipe inlet, that is, "hot coupling" or placing both the clad melter and the core melter or melter systems in a working or operative position in the apparatus; and dispensing molten glass from each of the core isopipe and the clad isopipe to form a laminated glass ribbon;

checking the centeredness, that is, the concentricity, of the clad down comer and inlet of the clad isopipe; and adjusting the moveable clad melter to ensure substantial concentricity between the clad down comer and inlet for the clad isopipe is substantially maintained.

The adjusting the relative linear position of and separation between the clad melter and the core melter can be accomplished, for example, by relative movement of the clad melter on a common path or vector with the core melter prior to fixing by at least one of: movement toward the other melter; movement apart from the other melter; or a combination thereof.

In embodiments, the method of use can further comprise, for example, adjusting the core melter to ensure that substantial concentricity between the down comer and inlet for the core isopipe is maintained.

In embodiments, the adjusting can be, for example, accomplished by at least one of: linear translation of the clad melter; tilting the clad melter, axially rotating the clad melter, or a combination thereof.

In embodiments, independently pre-heating the first core melter and the second clad melter can be, for example, continued until thermal equilibrium is achieved.

In embodiments, independently pre-heating the clad melter and core melter to an elevated temperature can be, for example, from about 1,200 to about 1,600° C., including intermediate values and ranges, and the elevated temperature depends on the glass compositions selected.

In embodiments, fixing the position of the clad melter and the core melter on the common path or vector (e.g., the same direction and magnitude but not necessarily co-linear) can be, for example, achieved with a single fastener or a plurality of fasteners.

In embodiments, the substantial concentricity can be, for example, from 0.01 to about 20% deviation from 100% concentric.

In embodiments, the disclosure provides an apparatus and method of use that are advantaged in many aspect, for example: the disclosed apparatus and method of use provide glass flow stability and control by avoiding: sheet shape modification; set up changes during a run; and sheet breakage due to flow profile or thickness changes.

EXAMPLE(S)

The following examples serve to more fully describe the manner of using the above-described disclosure, and to further set forth best modes contemplated for carrying out various aspects of the disclosure. These examples do not limit the scope of this disclosure, but rather are presented for illustrative purposes. The working example(s) further describe(s) the apparatus and method of using the apparatus of the disclosure.

Figure 1:
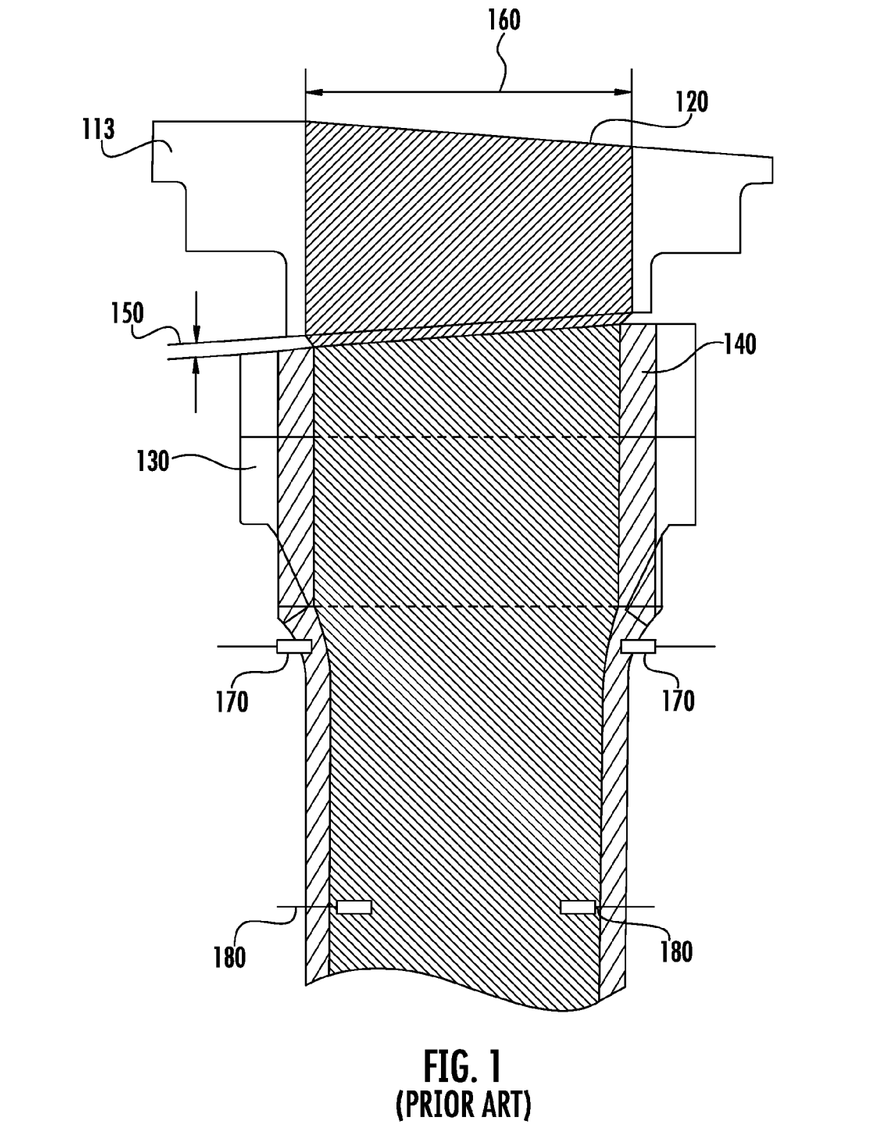
FIG. 1 is a schematic view of a portion of a laminate fusion draw glass fabrication apparatus having two isopipes and a draw down region.

Referring to the Figures, FIG. 1, provides a schematic view of a portion of a laminate fusion draw glass fabrication apparatus and draw down region. FIG. 1, by way of background, shows an exemplary side view of a PRIOR ART (as disclosed, for example, in commonly owned and assigned copending U.S. Patent Application 61/729,805 entitled "Thermal Control Of The Bead Portion Of A Glass Ribbon") double fusion apparatus and process having a clad glass stream (120) from the upper isopipe (113) streaming onto the core glass stream (140) from the lower isopipe (130) across the gap (150). FIG. 1 additionally shows the clad dam-to-dam dimension (160), which can be varied if desired, optional edge rolls or edge roller pairs (ER) (170) that can maintain consistency of or prevent attenuation of the width dimension of the core stream or the core glass sheet, and optional pull roll or puller roller pairs (PR) (180) or tractor rolls that can maintain consistency of the laminate thickness and further regulate the speed of the lamination process.

FIG. 2 shows an exemplary laminate fusion draw melt system (200) having a first movable melt unit (201) adapted with a transport roller (202) or caster for within-plane linear movement atop a rigid structure, such as a railing, race or track (210) providing a common path with another movable melt unit (205). The movement can be controlled by, for example, a linear drive motive force unit (215), for example, a servo motor or like devices, having, for example, a ball screw (217) and an encoder (219), which are connected to the movable melt unit (201) via a connector (220), such as rod or like connectors. Attached to and residing within the movable melt unit (201) is a movable down comer (131a) or "travelling" clad down comer. The "travelling" clad down comer (131a) is adapted to transport a molten glass stream from the clad melt source to clad inlet tube (134), and then to the clad isopipe (113). One or more position sensor(s) (232), and like sensors, can be positioned at, for example, a reference point on the clad down comer (131a), the clad inlet tube (134), or both, to continuously monitor position, to adjust relative position, or both. The position sensor(s) (232) can be in electrical in communication with the control unit (230) and can actuate adjustment of the relative position of the clad (second) movable melter unit and the "travelling" clad down comer (131a) with respect to the position of the clad inlet tube (134). The motive force unit (215), and the encoder (219) can be in electrical in communication with control unit (230). Additionally, FIG. 2 shows the disclosed laminate fusion draw melt system (200) has another movable (first) melter (205) unit that is similarly adapted with a transport roller or one or more casters for within-plane linear movement atop the rigid structure (210), such as a railing, race, or track, providing a common path with the other movable melt unit (201). The movement can be controlled by, for example, a linear drive motive force unit (not shown), for example, a servo motor or like devices, having, for example, a ball screw (not shown) and an encoder (not shown), which are connected to the movable melt unit (205) via a connector (not shown), such as rod or like connectors. Attached to and residing within the movable melt unit (205) is a fixed down comer (131b) or "stationary" core down comer. The "stationary" core down comer (131b) is adapted to transport a molten glass stream from the core melt source to core inlet tube (133), and then to the core isopipe (130). The fixed or "stationary" core down comer (131b) and the inlet tube (133) preferably share a co-linear center line or axis (207), see also FIG. 4, for the purpose of achieving or satisfying concentricity between core down comer (131b) and the core inlet tube (133). A position sensor(s) (not shown), and like sensors, can be positioned at, for example, a reference point on the core down comer (131b), the core inlet tube (133), or both, to continuously monitor the position, to adjust relative position of either the down comer (131b), the core inlet tube (133), or both. The position sensor(s) (232) can be in electrical communication with a control unit (not shown) and can actuate adjustment of the relative position of the first movable melter (205) unit and the fixed down comer (131b) with respect to the position of the core inlet tube (133). The motive force unit and the encoder can be in electrical communication with a control unit to adjust the position of the movable unit (205).

Enclosures (132) provide surrounds for heating and insulating the paired isopipes (113, 130), such as a muffle and doghouse, respectively.

FIG. 3 shows additional details of the clad melter unit or second movable melt unit (201) of FIG. 2 having a movable housing or frame (201a). The glass manufacturing apparatus (200) in FIG. 2, as shown in FIG. 3, can include, for example, an unheated batch filing unit (101) including (not shown), for example, a drive motor, a screw drive, and a controller for delivering batch ingredients to a melting vessel (110), a fining vessel (115), a mixing vessel (120), and a delivery vessel (125). A thermal barrier (102) or partition separates the unheated batch filing unit (101) on the left side of the barrier (102) from the heated melt equipment on the right side of the barrier (102). The melting vessel (110) is fluidly coupled to the fining vessel (115). The fining vessel (115) is fluidly coupled to the mixing vessel (120) by a connecting tube (122). The mixing vessel (120) is, in turn, fluidly coupled to the delivery vessel (125) by a connecting tube (127). The delivery vessel (125) is fluidly coupled to the clad isopipe and a fusion draw area (not shown) below through the clad down comer (131a). In embodiments, the apparatus can preferably include one or more glass seals (118) situated between the heated components, which seals permit dimensional expansion of one or more of the heated components and provide a physical seal between adjacent heated components.

Still referring to FIG. 3, during operation or in operation of the glass manufacturing apparatus, glass batch materials are introduced into the melting vessel (110) as indicated by arrow (112). The batch materials are melted in the melting vessel (110) to form molten glass (126). The molten glass (126) flows from the melting vessel (110) to the fining vessel (115). The fining vessel (115) receives the molten glass (126) in a high temperature processing area in which bubbles are removed from the molten glass (126). After being processed in the fining vessel (115), the molten glass (126) flows from to the mixing vessel (120) via connecting tube (122) in which the molten glass (126) is mixed. After being mixed in the mixing vessel (120), the molten glass (126) flows into the delivery vessel (125) via connecting tube (127).

The delivery vessel (125) supplies the molten glass (126) through a down comer (131a) member into the clad inlet (134) (not shown) port of the FDM, through which the molten glass (126) is supplied to the forming vessel (135) (not shown).

One or more of the enumerated melt unit components can be supported by support members (301) and further equipped with one or more transport rollers (302). The transport rollers permit lateral (e.g., in plane; left-right) positional adjustment of the melt unit components when, for example, the components have been heated and equilibrated at or about the operating temperature with molten glass. The melt unit components can be positionally adjusted, for example, using a second linear drive motive force unit (315) attached to the housing or frame (201), such as with a ball screw (317), and an encoder (319), and associated controls (not shown). A brake or connector member (330) can be attached to one or more of enumerated melt unit components (110; shown), which member can be used to positionally adjust or positionally fix the respective melt unit components with respect to the movable housing or unit (201a). The positional adjustment and positional fixing of the melt unit components can be accomplished for the purpose of dimensionally compensating for thermal expansion of the components and to position the clad flow down comer (131a) in close alignment with the clad inlet tube (134). Additional positional adjustment and positional fixing can be accomplished with the motive system described for FIG. 2 using, for example, the transport roller(s) (202) on race, railing, or track (210) surface.

Figure 4A:
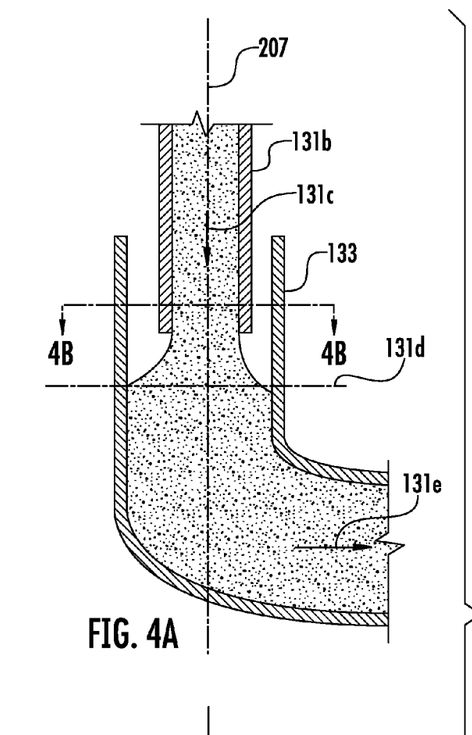
FIGS. 4A and 4B, show further relational concentricity details of the fixed or "stationary" core down comer and its junction with the core isopipe inlet tube shown in FIG. 2.
Figure 4B:
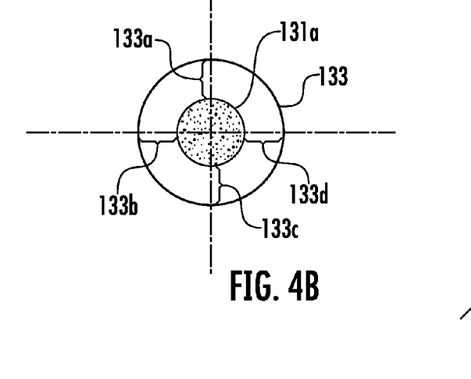

FIGS. 4A and 4B, show further relational details of the fixed or "stationary" core down comer (131b) and its junction with the core isopipe inlet tube (133) described in FIG. 2. FIG. 4A shows relational details of the fixed or "stationary" core down comer (131b) junction with the core isopipe inlet tube (133). Operationally, molten glass (131c) flows from the core down comer (131b) and smoothly passes into the inlet tube (133). The molten glass flow rate is preferably maintained to insure that the instantaneous level of molten glass in the inlet tube is maintained approximately at a predetermined "fill" line (131d) and to insure an adequate flow (131e) and pressure of molten glass entering the inlet tube and going to the core isopipe. The clad down comer (131b) and the clad inlet tube (133) preferably are aligned or share a common axis (207) or center line. Alignment of the clad down comer (131b) and the clad inlet tube (133) can be accomplished during initial set up or instantaneously in real time, for example, during or in operation of the apparatus, such as during production runs. The positionally fixed core down comer and the positionally fixed core inlet tube can be aligned during initial set up to share a common axis or center line. Alignment of a down comer with its corresponding isopipe inlet tube in coincidence with a common axis provides 100% concentricity of the down comer and the inlet tube. FIG. 4B shows in cross-section the relational details of the section 4B of FIG. 4A. A concentric junction between the clad down comer (131b) with the clad isopipe inlet tube (133) provides spacings (133a, 133b, 133c, 133d) that are preferably equal or nearly equal between the down comer and the inlet tube. One or more sensors can be situated to monitor the spacings or equivalent measures, and the results can be used to manually, mechanically, or automatically, maintain or adjust one or more of the spacings to the concentric condition. In embodiments, it may be desirable to intentionally deviate from the concentric condition to affect certain characteristics ornon-uniformities in the resulting laminate glass sheet. Sensors and associated adjustment mechanisms can optionally be provided to monitor and optionally adjust the extent of penetration of down comers (101a, 131b) into inlet tubes (134, 133), i.e., raising or lowering for z-axis vertical adjustments.

Coordinate axes are included in FIG. 2 to provide a frame of reference for various components of the continuous glass ribbon fabrication apparatuses and methods described herein. As used herein, a "lateral" or "across-the-draw" direction is defined as the positive x or negative x direction of the coordinate axes shown in the drawings. A "downstream" or "drawing" direction is defined as the negative y direction of the Cartesian coordinate axes shown in FIG. 2. An "upstream" direction is defined as the positive y direction of the coordinate axes shown in FIG. 2.

LFDM Moveable Carriage for Clad Melting System Support

In embodiments, the carriage movement can be linked to the LFDM clad muffle adjustment. In embodiments, the down comer of the core melting system is maintained positionally fixed or in a set position during normal operation. The down comer remains centered or concentric with the core inlet of the LFDM. The down comer of the clad melting system can be moved synchronously with the absolute movement of the clad inlet of the LFDM to keep the down comer centered.

Melting Systems Configuration for the LFDM

In embodiments, the core melter and the clad melter melting systems can be, for example, adjacent to each other and can be horizontally aligned to correspond with the flow of their corresponding isopipes. This position is important to avoid glass quality issues in the final product. Each down comer delivers a continuous flow of glass to each respective clad and core inlet of the isopipes.

In embodiments, the clad melting system can be comprised of, for example, a fill machine, a melter, a finer, and a delivery system. The clad melting system can be supported by, for example, a movable carriage or trolley (201). This carriage can be coupled with a rigid structural frame (201a) and, for example, a track having a ball screw, a gear box reducer, and a 1 HP motor. The carriage can move in one axial direction, for example, from side-to-side, such as forward and backward, left and right, or up and down.

In embodiments, in one laminate fusion draw machine (LFDM) configuration, two melting systems can be used. The first melting system is dedicated to forming the core glass, and the second melting system is dedicated to forming the clad glass. Typically, the core glass has a higher flow rate or throughput (e.g., pounds per hour) compared to the clad glass flow rate or throughput. The core glass flow rate (or throughput) can be fixed or established at the beginning of a production run and can determine other aspects of the process. The clad glass flow rate (or throughput) typically has a lower flow rate or throughput compared to the core, and the clad glass flow rate can be adjusted in accordance with the core glass flow rate. In embodiments, the disclosure provides an apparatus and method that can adjust and maintain a continuous uniform glass flow on the core and clad isopipes.

Suspension System—Control Components

The core and clad muffles can each be independently supported by separate suspension system. Four vertical support rods from each muffle can be mounted to two horizontal sets of twin I-beams. Each support rod can be adjusted manually or mechanically, for example, each support rod can be adjusted mechanically using a separately controlled one (1) horsepower electric motor. Each muffle can be moved horizontally in the direction of the glass sheet (inlet-to-compression end) with, for example, two motors. Each muffle can be moved horizontally in the right-to-left side direction manually. A variable differential transformers (VFD) can be used for all twelve motors.

In embodiments, the disclosure can provide additional or alternative control components, for example:
- a contactor, such as having twelve contactors, one for each motor;
- an external brake, such as having eight external brakes, having one brake for each Z-axis motor;
- an incremental rotary encoder, such as twelve incremental rotary encoders, having one encoder on the input of each Z-axis and the X-axis;
- an axis jackscrew;
- a linear variable differential transformer, such as four linear variable differential transformers (LVDTs) with a range of +/−100 mm;
- a first limit switch, such as sixteen limit switches, one high limit switch and one low limit switch mounted on each jackscrew to provide over travel protection in the Z-axis of motion; and
- a second limit switch, such as eight limit switches, that is one inlet limit switch and one compression limit switch mounted on each jackscrew to provide over travel protection in the X-axis of motion.

Control Logic for Raising or Lowering LFDM

Raising or lowering the FDM can involve the simultaneous and synchronized raising or lowering of both muffles. All of the Z-axis motors will run in the same direction (up or down) and at the same speed. The drive parameters for speed ramping can be identical for all drives so the motor speeds will all be the same as they accelerate and decelerate. The encoders on the jackscrews can provide feedback to ensure the travel of both muffles is exactly the same. The LVDTs should show that the distance between the muffles remain substantially constant throughout the motion.

In embodiments, there can be, for example, two operating speeds to select from: high and low. These speeds can be configurable from, for example, with a PanelView Plus graphics terminal (available from Rockwell automation) and iFix industrial control software (available from General Electric Intelligent Platforms).

The system can be run in a "jJog mode" until the desired position is reached, or a specified movement distance or final position can be entered using the PanelView. Programmed motion can be interrupted at any time using the Stop or E-Stop functions. Engaging a high or low limit switch will stop all system motion and trigger an alarm.

Process for Down Comer Alignment

In embodiments, the core inlet tube is fixed in space. If the core melter expansion is away from FDM isopipes then the FDM expansion is towards the clad melter. If the clad melter expansion is away from the FDM then the clad melter is moved to align with the clad down comer and the clad inlet tube. The entire clad melting system can be mounted on a carriage and moved or adjusted on tracks, using, for example, a 1 horsepower motor.

The control system for the clad melter and the FDM can be integrated and can be synchronized. For example, both muffles can be moved together for vertical alignment.

The disclosure has been described with reference to various specific embodiments and techniques. However, it should be understood that many variations and modifications are possible while remaining within the scope of the disclosure.

What is claimed is:

1. A laminate fusion draw apparatus comprising:
   a core isopipe having a first core melter, the core melter being, in operation, in flow communication with and providing molten glass to the core isopipe;
   a clad isopipe atop the core isopipe, the clad isopipe having a clad melter, the clad melter being, in operation, in flow communication with and providing molten glass to the clad isopipe;
   a first core down comer between the core melter and the core isopipe, the first down comer having an adjustable and fixable horizontal position and a fixed vertical position; and
   a second clad down comer between the clad melter and the clad isopipe, the second clad down comer having an independently adjustable linear and horizontal position with respect to a fixed horizontal position of the first down comer, the core melter and the clad melter are linearly moveable for relative movement in the same or opposite horizontal direction, and in operation, the first core down comer remains substantially centered on the first inlet tube of the core isopipe, and the second clad down comer remains substantially centered on the second inlet tube of the clad isopipe.

2. The apparatus of claim 1 further comprising a sensor to monitor the concentricity of the second clad down comer and the second inlet tube of the clad isopipe.

3. The apparatus of claim 1 further comprising a mechanism to adjust the concentricity of the second clad down comer and the second inlet tube of the clad isopipe.

4. The apparatus of claim 1 further comprising a sensor to monitor the concentricity of the second clad down comer with respect to the second inlet tube of the clad isopipe, and a mechanism to adjust the concentricity of the second clad down comer with respect to the second inlet tube of the clad isopipe in response to the sensor signaling a deviation from concentricity.

5. The apparatus of claim 1 wherein the core melter and clad melter are co-located on the same horizontal and linear path.

6. The apparatus of claim 1 wherein the core melter and clad melter are co-located on two different horizontal and parallel paths.

7. The apparatus of claim 1 wherein the core melter and clad melter are each housed within a separate movable carriage, and each carriage is independently movable in the x-axis directions, the z-axis directions, or both.

8. The apparatus of claim 1 wherein the clad isopipe comprises a plurality of stacked isopipes.

9. The apparatus of claim 1 wherein the clad melter comprises:
a batch filling machine;
a melt vessel;
pre-melt fluidly coupled transport finer vessel; and
a delivery system comprising:
a finer-to-stir chamber conduit;
a stirring chamber;
a stir chamber to bowl conduit;
a delivery vessel; and
a down comer.

10. A method of using the apparatus of claim 1 comprising:
selecting a batch glass composition for each of the clad melter and the core melter;
independently pre-heating the clad melter and the core melter to an elevated temperature until expansion of the clad melter, the core melter, and glass seals form between glass jointed components;
setting the gaps and forming the seals between adjacent melter components in each of the clad melter and the core melter by adjusting the relative linear position of and separation between the clad melter and the core melter;
fixing the relative position of the clad melter and the core melter;
filling the respective clad melter and the core melter with the selected batch glass compositions;
initiating flow of the molten glass in each of the respective clad melter and the core melter;
coupling the fixed down comer associated with the core melter and the core isopipe inlet;
dispensing molten glass from each of the core isopipe and the clad isopipe to form a laminated glass ribbon;
checking the centeredness of the clad down comer with respect to inlet of the clad isopipe; and
adjusting the clad melter to ensure substantial concentricity between the clad down comer and inlet for the clad isopipe is maintained.

11. The method of claim 10 wherein adjusting the relative linear position of and the separation between the clad melter and the core melter is accomplished by relative movement of the clad melter on a common path with the core melter prior to fixing by at least one of: movement toward the other melter; movement apart from the other melter; or a combination thereof.

12. The method of claim 10 further comprising adjusting the core melter to ensure substantial concentricity between the down comer with respect to the inlet for the core isopipe is maintained.

13. The method of claim 10 wherein the adjusting is accomplished by at least one of: linear translation of the clad melter (x-axis); raising or lowering the clad melter (z-axis); tilting the clad melter (x-and z-axes), or a combination thereof.

14. The method of claim 10 wherein independently pre-heating the first core melter and the second clad melter is continued until thermal equilibrium is achieved.

15. The method of claim 10 wherein independently pre-heating the clad melter and core melter to an elevated temperature is from about 1,100 to about 1,730° C., and the elevated temperature depends on the melt properties of the glass compositions selected.

16. The method of claim 10 wherein fixing the position of the clad melter and the core melter on the common path is achieved with a fastener.

17. The method of claim 10 wherein ensured substantial concentricity is from 0.01 to about 20% relative deviation from 100% concentric.

* * * * *